United States Patent
Wu et al.

(10) Patent No.: US 11,539,611 B2
(45) Date of Patent: Dec. 27, 2022

(54) FINE-GRAINED NETWORK MONITORING

(71) Applicant: Microsoft Technology Licensing, LLC, Redmond, WA (US)

(72) Inventors: Haitao Wu, Beijing (CN); Chuanxiong Guo, Nanjing (CN); David A. Maltz, Bellevue, WA (US); Lihua Yuan, Sammamish, WA (US); Yongguang Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/272,728

(22) Filed: May 8, 2014

(65) Prior Publication Data

US 2015/0326457 A1 Nov. 12, 2015

(51) Int. Cl.
| | |
|---|---|
| *H04L 43/50* | (2022.01) |
| *H04L 43/0817* | (2022.01) |
| *H04L 43/12* | (2022.01) |
| *H04L 43/0811* | (2022.01) |

(52) U.S. Cl.
CPC .......... *H04L 43/50* (2013.01); *H04L 43/0811* (2013.01); *H04L 43/0817* (2013.01); *H04L 43/12* (2013.01)

(58) Field of Classification Search
CPC ...... H04L 43/0817; H04L 43/50; H04L 43/12
See application file for complete search history.

(56) References Cited

U.S. PATENT DOCUMENTS

| | | | | |
|---|---|---|---|---|
| 5,488,608 | A | * | 1/1996 | Flammer, III ..... H04Q 11/0478 370/400 |
| 5,898,674 | A | * | 4/1999 | Mawhinney .............. H04J 3/14 370/247 |
| 7,136,377 | B1 | | 11/2006 | Tweedly et al. |
| 7,274,869 | B1 | * | 9/2007 | Pan ...................... H04B 10/032 398/19 |
| 7,356,031 | B1 | * | 4/2008 | Toebes .................... H04L 45/00 370/392 |

(Continued)

FOREIGN PATENT DOCUMENTS

| | | |
|---|---|---|
| CN | 101478427 A | 7/2009 |
| EP | 2398188 | 12/2011 |

(Continued)

OTHER PUBLICATIONS

Perkins, "IP Encapsulation within IP", Network Working Group, 1996, 15 pages.

(Continued)

*Primary Examiner* — Derrick W Ferris
*Assistant Examiner* — Chuong M Nguyen
(74) *Attorney, Agent, or Firm* — Schwegman Lundberg & Woessner, P.A.

(57) ABSTRACT

In some cases, a network monitoring system may determine an operating or health condition of a node or connection link in a network (e.g., a datacenter network) by preparing an encapsulated data packet according to a tunneling protocol. Depending on a result of routing the encapsulated data packet, the network monitoring system determines whether the node or connection link is functioning normally or is experiencing an issue such as overloading or malfunctioning.

12 Claims, 6 Drawing Sheets

(56) References Cited

U.S. PATENT DOCUMENTS

| | | | | |
|---|---|---|---|---|
| 7,586,915 | B1* | 9/2009 | Indiresan | H04L 12/4645 370/392 |
| 7,849,497 | B1* | 12/2010 | Hurst | H04L 67/75 713/153 |
| 7,937,492 | B1* | 5/2011 | Kompella | H04L 45/22 709/239 |
| 7,974,219 | B2* | 7/2011 | Strahan | H04L 41/12 370/254 |
| 8,023,410 | B2 | 9/2011 | O'Neill | |
| 8,169,911 | B2 | 5/2012 | Viger et al. | |
| 8,908,539 | B1 | 12/2014 | Pani | |
| 9,768,917 | B2* | 9/2017 | Taniguchi | H04L 45/28 |
| 2002/0165934 | A1* | 11/2002 | Conrad | H04L 41/12 709/217 |
| 2004/0001508 | A1* | 1/2004 | Zheng | H04L 12/4633 370/466 |
| 2005/0086367 | A1* | 4/2005 | Conta | H04L 47/2491 709/238 |
| 2006/0203819 | A1* | 9/2006 | Farinacci | H04L 45/16 370/408 |
| 2006/0274791 | A1* | 12/2006 | Garcia | H04L 43/0864 370/508 |
| 2006/0282435 | A1* | 12/2006 | Moon | G06F 11/201 |
| 2007/0242607 | A1* | 10/2007 | Sadler | H04L 41/12 370/238 |
| 2008/0034415 | A1* | 2/2008 | Chacko | G06F 21/552 726/14 |
| 2008/0080507 | A1* | 4/2008 | Swallow | H04L 43/50 370/392 |
| 2009/0122748 | A1* | 5/2009 | Gourhant | H04L 45/123 370/328 |
| 2009/0168701 | A1* | 7/2009 | White | H04L 12/5692 370/328 |
| 2009/0327901 | A1* | 12/2009 | Kapadia | H04J 14/0227 398/83 |
| 2010/0138885 | A1* | 6/2010 | Haimi-Cohen | H04N 21/6437 725/109 |
| 2011/0032843 | A1* | 2/2011 | Papp | H04L 12/4666 370/254 |
| 2011/0238822 | A1* | 9/2011 | Weniger | H04W 80/045 709/224 |
| 2012/0063345 | A1* | 3/2012 | Krzanowski | H04L 43/106 370/252 |
| 2012/0099443 | A1* | 4/2012 | Makishima | H04L 43/0811 370/248 |
| 2012/0127995 | A1* | 5/2012 | Singh | H04L 45/302 370/392 |
| 2012/0166394 | A1* | 6/2012 | Kim | G06F 16/184 707/634 |
| 2013/0021916 | A1 | 1/2013 | Zhou et al. | |
| 2013/0088977 | A1 | 4/2013 | Baillargeon | |
| 2013/0163426 | A1* | 6/2013 | Beliveau | H04L 67/327 370/235 |
| 2014/0126387 | A1* | 5/2014 | Gintis | H04L 43/50 370/252 |
| 2014/0211798 | A1* | 7/2014 | Decker | H04L 45/74 370/392 |
| 2015/0025859 | A1* | 1/2015 | Tamma | G06F 30/23 703/2 |
| 2015/0195178 | A1* | 7/2015 | Bhattacharya | H04L 45/745 718/1 |
| 2016/0112267 | A1* | 4/2016 | Miller | H04L 45/121 709/223 |

FOREIGN PATENT DOCUMENTS

| | | |
|---|---|---|
| JP | 2007243466 A | 9/2007 |
| JP | 2008252541 A | 10/2008 |
| JP | 2009004927 A | 1/2009 |
| JP | 2012501129 A | 1/2012 |

OTHER PUBLICATIONS

Search Report & Written Opinion dated Apr. 18, 2016 in PCT Application No. PCT/US2015/025381.

PCT invitation to Pay Additional Fees dated Jun. 29, 2016 for PCT Application No. PCT/US15/25381, 3 pages.

International Preliminary Report on Patentability Issued in PCT Application No. PCT/US2015/025381, dated Sep. 27, 2016, 11 pages.

"Office Action Issued in Australian Patent Application No. 2015256589", dated Aug. 8, 2018, 3 Pages.

"Office Action and Search Report Issued in Russian Patent Application No. 2016143543", dated Oct. 22, 2018, 11 Pages.

"Office Action Issued in Japanese Patent Application No. 2016-567009", dated Jul. 23, 2019, 8 Pages.

"First Office Action & Search Report Issued in Chinese Patent Application No. 201580023950.9", dated Feb. 28, 2019, 25 Pages.

"Office Action Issued in Japanese Patent Application No. 2016-567009", dated Feb. 19, 2019, 8 Pages.

"Second Office Action Issued in Chinese Patent Application No. 201580023950.9", dated Aug. 14, 2019, 7 Pages.

"Office Action Issued in Indian Patent Application No. 201647038034", dated Jan. 21; 2021, 7 Pages.

"Office Action Issued in Canadian Patent Application No. 2946545", dated May 27, 2021, 5 Pages.

"Office Action Issued in Korean Patent Application No. 10-2016-7032273", dated Jul. 22, 2021, 13 Pages.

"Notice of Allowance Issued in Korean Patent Application No. 10-2016-7032273", dated Jan. 26, 2022, 18 Pages.

* cited by examiner

FINE-GRAINED NETWORK MONITORING

BACKGROUND

A datacenter network interconnects an enormous number of devices and enables data transmission from one device to another device in the network. In order to provide reliable data transmission, a topology of the datacenter network is normally designed to allow multiple paths between two devices in the network for data transmission. Although the multiple-path design may provide smooth degradation in performance in times of failure and traffic congestion, this design may also increase the difficulty of identifying any failed or unhealthy device or connection link between devices in the network.

SUMMARY

This summary introduces simplified concepts of fine-grained network monitoring, which are further described below in the Detailed Description. This summary is not intended to identify essential features of the claimed subject matter, nor is it intended for use in limiting the scope of the claimed subject matter.

This application describes example embodiments of fine-grained network monitoring. In one embodiment, a sending node determines or selects one or more specific nodes or connection links of which operating or health conditions are to be analyzed. Upon determining the one or more specific nodes or connection links, the sending node may iteratively encapsulate or wrap data packets corresponding to the one or more specific nodes or connection links to form a test data packet. In one embodiment, the sending node may insert or include information that enables the test data packet to route through the one or more specific nodes or connection links in packet headers of the data packets corresponding to the one or more specific nodes or connection links. In some embodiments, after forming the test data packet, the sending node may send out the test data packet to a network (e.g., a datacenter network). The sending node or a destination node which receives the test data packet may determine the operating or health conditions of the one or more specific nodes or connection links based at least in part on whether the test data packet is received according to a predetermined criterion.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
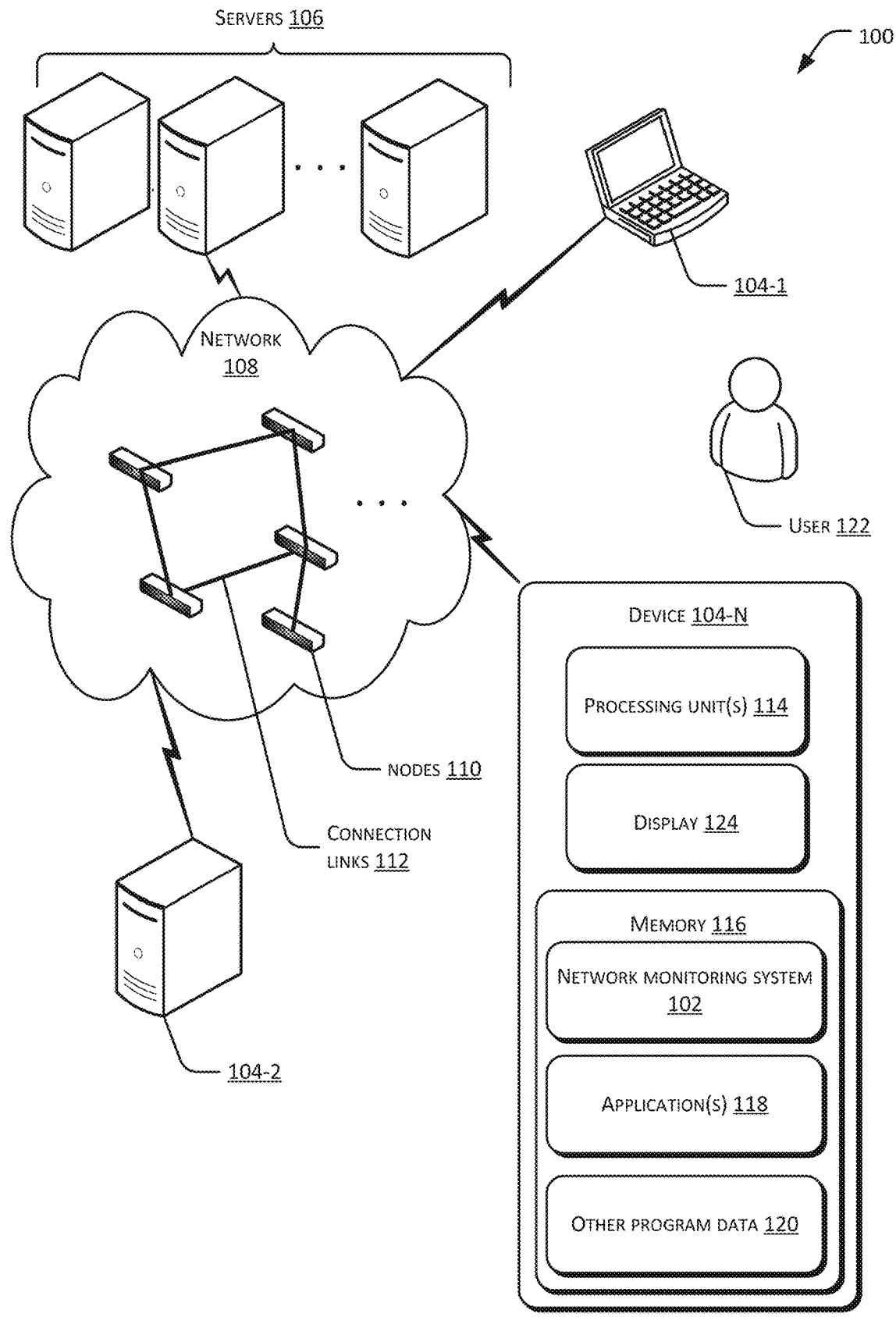
FIG. 1 illustrates an example environment of a fine-grained network monitoring system.

A number of algorithms have been proposed for network monitoring and identification of failed devices and connection links. However, such algorithms may not only introduce a large amount of additional traffic in the network during network monitoring, but may also fail to efficiently and accurately identify a failed device or connection link (e.g., one that functions improperly and/or has overloaded).

This disclosure describes a network monitoring system usable in a data or communication network such as a datacenter network. The network monitoring system determines or selects a node or link of which operating or health condition is to be analyzed or probed, and creates a data packet (e.g., a test data packet) that is configured to route or traverse through that node or link in order to determine the operation or health condition of the node or link. In one embodiment, the network monitoring system may create or generate a test data packet that includes multiple layers or levels of data packets using tunneling capsulation, with at least one layer or level of data packet being configured to traverse the particular node or link to be analyzed. Based on a routing result of the test data packet, the network monitoring system may determine the operation or health condition of the node or link to be analyzed and may report an analysis result to a relevant person, e.g., an network administrator or operator of the network, for subsequent analysis and maintenance.

In one embodiment, the operation or health condition of the node or link may include, but is not limited to, whether the node or link functions properly or as intended, whether the node or link is overloading, whether the node or link is broken, etc. In some embodiments, the network monitoring system may select a node or path randomly or strategically (e.g., based on a particular selection algorithm, etc.). Additionally or alternatively, the network monitoring system may determine or select more than one node and/or link for analyzing respective operating or health conditions in a single monitoring probe or multiple monitoring probes.

After determining or selecting a node or link of which operating or health condition is to be analyzed or probed, the network monitoring system may determine or select a strategy for routing a data packet to that node or link. In one embodiment, the network monitoring system may create a first data packet and a second data packet, and wrap or include the second data packet within the first data packet to generate or create a test data packet. In one instance, the network monitoring system may generate or create the test data packet using tunneling capsulation. The network monitoring system may set one or more properties in a packet header of the first data packet to direct the first data packet to traverse or route through the selected node or path. By way of example and not limitation, the network monitoring system may set a destination address in the packet header of the first data packet to be an address associated with the selected node or link. In one embodiment, the address associated with the selected node or link may include, for example, a global address corresponding to an address routable in the network, a local address corresponding to an address routable or reachable only by, for example, one or more nodes that are adjacent to the selected node or link.

Additionally or alternatively, in some embodiments, the network monitoring system may set one or more other properties in the packet header of the first data packet that may be used to reflect or define a path to the selected node or link. For example, the network monitoring system may set a property value for a hop count (i.e., a number of hops) or a hop limit (i.e., a maximum number of hops that a data packet is allowed to travel before the data packet is discarded or dropped) to reflect or define a path to the selected node or link in the packet header of the first data packet.

If more than one node or link is to be analyzed in this monitoring probe, the network monitoring system may wrap or encapsulate data packets iteratively to generate or create a test data packet, with one or more properties in respective packet headers to be set to define corresponding nodes or links to be analyzed.

Upon generating the test data packet, the network monitoring system may send the test data packet which includes one or more other data packets to the network. In one embodiment, the network monitoring system may send the test data packet to a destination node which may be the same as or different from a node from which the test data packet is sent or originated. In one instance, sending the test data packet back to a node in which the network monitoring system resides frees the network monitoring system from requesting and waiting for a routing result of the test data packet from another node at which the test data packet received.

In one embodiment, the network monitoring system may determine the operating or health condition of the selected node or link based on one or more predetermined criteria. The one or more predetermined criteria may include, but are not limited to, whether the data packet is successfully received at the destination node, whether the data packet is received at the destination node within a predetermined time period, etc.

If the data packet meets the one or more predetermined criteria, the network monitoring system may determine that the selected node or link is working properly or as expected. If the data packet fails to meet the one or more predetermined criteria, the network monitoring system may determine that the selected node or link is susceptible to malfunctioning and/or overloading. In some embodiments, the network monitoring system may perform further analysis to determine whether the selected node or link is malfunctioning or overloading.

The described system selects or determines a particular node or link for determining whether that particular node or link functions properly, and therefore allows fine-grained monitoring of one or more nodes in a network such as a datacenter network. The described system may report an operation condition of the node or link to a network administrator or operator for further analysis and/or subsequent maintenance.

In the examples described herein, the network monitoring system determines a node or link for analysis, encapsulates a first data packet within a second data packet, sends out the second data packet, and determines an operation of the node or link based on whether the first data packet is received according to one or more predetermined criteria. However, in other embodiments, these functions may be performed by one or more services located at a same location or different locations. For example, in at least one embodiment, a selection service may select which node or link is to be probed, while a preparation service may prepare a data packet including encapsulated packets to be sent. A sending service may send out the data packet to a destination node, and a determination service may determine an operation or health condition of the selected node or link based on one or more predetermined criteria.

Furthermore, although in the examples described herein, the network monitoring system may be implemented as software and/or hardware installed in a single device or as a service, in other embodiments, the network monitoring system may be implemented in a plurality of devices and/or services provided in one or more servers over a network and/or distributed in a distributed computing architecture or a cloud computing architecture.

The application describes multiple and varied implementations and embodiments. The following section describes an illustrative example of a framework that may be used for practicing various implementations. Next, the application describes example systems, devices, and processes for implementing a network monitoring system.

Example Framework

FIG. 1 illustrates an example framework 100 usable to implement a network monitoring system 102. In this example, the network monitoring system 102 is described as included in one of a plurality of devices 104-1, 104-2, . . . , 104-N (which are collectively referred to as devices 104). However, in other instances, the network monitoring system 102 may be an entity independent or separate from the device 104. For example, the network monitoring system 102 may be included in and/or distributed among one or more server(s) 106, which may communicate data with one another and/or with the devices 104 via a network 108. Additionally or alternatively, in some instances, the functions of the network monitoring system 102 may be included in and/or distributed among one or more devices 104 and one or more servers 106. For example, the one or more servers 106 may include part of the functions of the network monitoring system 102 while other functions of the network monitoring system 102 may be included in the one or more devices 104. Furthermore, in some embodiments, some or all the functions of the network monitoring system 102 may be included in a cloud computing system or architecture that are formed by the servers 106 and/or the devices 104, for example. In other instances, one or more servers 106 may be part of the network 108.

One or more of the devices 104 may be implemented as any of a variety of computing devices including, but not limited to, a desktop computer, a notebook or portable computer, a handheld device, a netbook, an Internet appliance, a tablet or slate computer, a mobile device (e.g., a mobile phone, a personal digital assistant, a smart phone, etc.), etc., or a combination thereof.

The network 108 may be a wireless or a wired network, or a combination thereof. The network 108 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof. Wired networks may include an electrical carrier connection (such a communication cable, etc.) and/or an optical carrier or connection (such as an optical fiber connection, etc.). Wireless networks may include, for example, a WiFi network, other radio frequency networks (e.g., Bluetooth®, Zigbee, etc.), etc. In one embodiment, the network 108 may include a datacenter network.

Additionally, in one instance, the network 108 may include a plurality of nodes 110 and a plurality of connection links 112. The plurality of nodes 110 may include switching or routing components, such as switches (e.g., commodity switches, etc.), routers, hubs, etc. In some embodiments, the plurality of nodes 110 may further include one or more devices having processing and/or storage capabilities, such as the devices 104. Together with the plurality of connection links 112, the plurality of nodes 110 may interconnect the plurality of devices 104 and the one or more servers 106 with one another. In one embodiment, the plurality of nodes 110 may be organized via the plurality of connection links 112 to form a particular topology for the entire network 108 or different topologies in different parts of the network 108. Example topologies may include, but are not limited to, a fat-like topology, a ring topology, a star topology, a bus topology, a hybrid topology, or various combinations thereof. In some instances, the plurality of nodes 110 may be organized as multiple layers of switches, including top-of-rack (ToR) switches, aggregate switches, core switches, etc.

In one embodiment, a particular device (e.g., the device 104-N) may include one or more processing units 114 coupled to memory 116. The one or more processing units 114 may be implemented as one or more hardware processors including, for example, a microprocessor, an application-specific instruction-set processor, a graphics processing unit, a physics processing unit (PPU), a central processing unit (CPU), a graphics processing unit (GPU), a digital signal processor, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 116 may include or store one or more applications 118 (e.g., a network monitoring application, etc.) that are executed by the one or more processing units 114, and other program data 120. The memory 116 may be coupled to, associated with, and/or accessible to other devices, such as network servers, routers, and/or the servers 106.

The memory 116 may include volatile memory, such as Random Access Memory (RAM) and/or non-volatile memory, such as read only memory (ROM) or flash RAM. The memory 116 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

A user 122 may use the application 118 (such as the network monitoring application, a browser application, etc.) of the device 104 to monitor an operation or health condition of a node 110 and/or a connection link 112 in the network 108. In one embodiment, the network monitoring application may be an application provided by the network monitoring system 102. In some embodiments, the network monitoring application may be an independent application that is able to communicate with the network monitoring system 102 and collaborate with the network monitoring system 102 to perform network monitoring. The network monitoring application may provide information associated with a topology of the network 108 in form of a map and/or a list, and may allow the user 122 to select a particular node 110 and/or a particular connection link 112 for analysis. After receiving an indication of selection of a node 110 and/or a connection link 112, the network monitoring system 102 creates a probe (e.g., a test data packet, etc.) to determine the operation or health condition of the selected node 110 and/or connection link 112, and returns a result of the analysis to the user 122 via a display 124 of the device 104, for example.

Example Network Monitoring System

Figure 2:
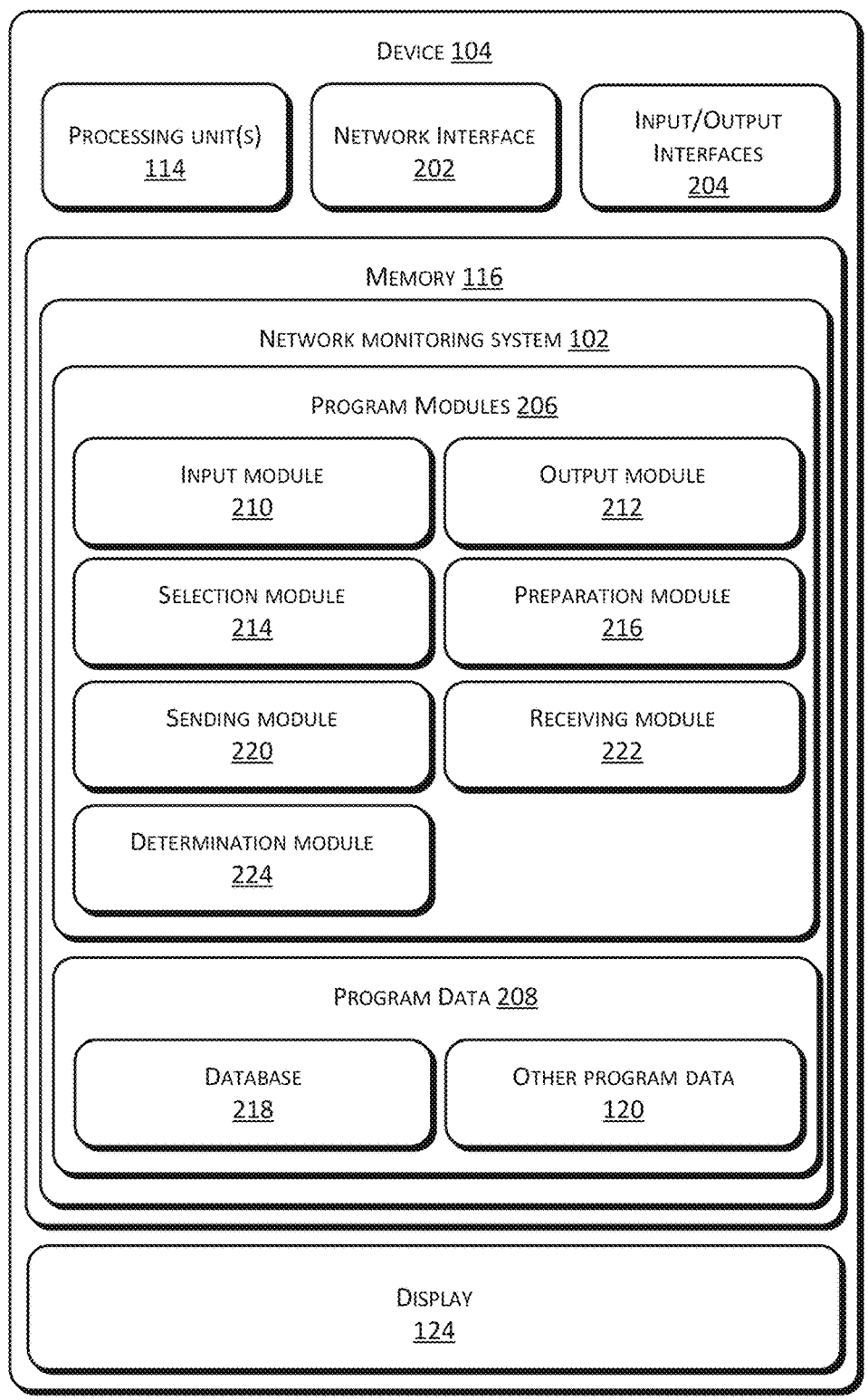
FIG. 2 illustrates an example of a device of the example fine-grained network monitoring system as shown in FIG. 1.

FIG. 2 illustrates an example network monitoring system 102 in more detail. In this example, the example network monitoring system 102 is described to be included in or part of a device 104. As described in the foregoing, the device 104 may include, but is not limited to, one or more processing units 114 and memory 116. Additionally, the device 104 may further include one or more applications 118. In some embodiments, the device 104 may further include a network interface 202 and an input/output interface 204. The one or more processing units 114 are configured to execute instructions received from the network interface 202, received from the input/output interface 204, and/or stored in the memory 116. In one embodiment, the device 104 further includes a display 124. The display 124 may include a touch screen, a normal screen (i.e., a screen without touch-sensitive capability), etc.

The network monitoring system 102 may include program modules 206 and program data 208. In one embodiment, the network monitoring system 102 may include an input module 210. The input module 210 may receive information associated with a node 110 or connection link 112 of which an operation or health condition is to be analyzed from the user 122. For example, an output module 212 of the network monitoring system 102 may provide a topological map (or a list) of all or a subset of the plurality of nodes 110 and/or connection links 112 for presentation to the user 122 in the display 124 of the device 104. In one embodiment, the output module 212 may provide the topological map or the list for presentation via the application 118 of the device 104, such as the network monitoring application, a browser application, for example. After the user 122 may select a node 110 or connection link 112 from the topological map or list, the input module 210 receives information of the selected node 110 or connection link 112 from the device 104 or the application 118.

Additionally or alternatively, the network monitoring system 102 may include a selection module 214. The selection module 214 may automatically or semi-automatically select a node 110 or a connection link 112 based on one or more selection algorithms or strategies. For example, the selection module 214 may randomly select a node 110 and/or a connection link 112 from the plurality of nodes 110 and/or the connection links 112. In some instances, the user 122 may have indicated a particular part of the network 108 to be analyzed to the network monitoring system 102. After receiving information of the particular part of the network 108 via the input module 210, the selection module 214 may select a node 110 and/or a connection link 112 randomly from that particular part of the network 108. In one embodiment, the selection module 214 may select a node 110 or a connection link 112 strategically, for example, by progressively selecting nodes 110 and/or connection links 112, starting from a node 110 or a connection link 112 that is closest to the device 104, up to a node 110 or a connection link 112 as indicated by the user 122. In some instances, the selection module 214 may randomly select one or more nodes 110 and/or connection links 122 within the particular part of the network 108. In one instance, the network monitoring system 102 may determine or select one or more nodes 110 and/or connection links 112 to be analyzed for a single monitoring probe or multiple monitoring probes. Additionally or alternatively, the network monitoring system 102 may probe the one or more nodes 110 and/or connection links 112 substantially at the same time or at different times.

Upon selecting a node 110 or connection link 112 to be analyzed, the network monitoring system 102 may employ a preparation module 216 to prepare a data packet to be sent for probing the operation or health condition of the selected node 110 or connection link 112. In one embodiment, the preparation module 216 may obtain information usable to route the data packet to the selected node 110 or connection link 112. By way of example and not limitation, the information usable to route the data packet to the selected node 110 or connection link 112 may include a global address, a local address, a (minimum) number of hops to reach the selected node 110, etc. The preparation module 216 may obtain the information usable to route the data packet to the selected node 110 or connection link 112 from a database 218 that includes address and/or identification information associated with the plurality of nodes 110 and the plurality of connection links 112. Additionally, in some embodiments, the database 218 may further include topological information of the network 108, and/or operation or health conditions of the plurality of nodes 110 and the plurality of connection links 112 that are determined at the one or more previous probes, etc.

In one embodiment, a local address of a node may correspond to a network address that is intended for communications within a neighborhood of the node and is reachable (only) by one or more neighboring nodes within the neighborhood of the node and/or a subset of nodes that are located within part or all of the network 108. Additionally, a global address of a node may correspond to a network address that is routable and/or accessible by another node inside and/or outside the network 108, e.g., the devices 104, the servers 106, etc. A number of hops or a hop count associated with a node corresponds to a number of hops needed to route the data packet from a node or device that sends out the data packet (e.g., the device 104 in this example) to the node 110. In some embodiments, information associated with the selected connection link 112 may include, but is not limited to, address or routing information (e.g., a global address, a local address, or a combination thereof, etc.) associated with nodes corresponding to two ends of the selected connection link 112.

Upon obtaining the information usable to route a data packet to the selected node 110 or connection link 112, the preparation module 216 may control or specify a path or a portion of the path that the data packet is to be traversed or routed through by preparing the data packet based on the obtained information. By way of example and not limitation, the preparation module 216 may prepare or generate a test data packet according to a tunneling protocol. Examples of the tunneling protocol may include, but are limited to, IP-in-IP, GRE (Generic Routing Encapsulation), MPLS (Multiprotocol Label Switching), etc. For sake of description, IP-in-IP tunneling protocol is used hereinafter for illustration. The present disclosure, however, is not construed to this IP-in-IP tunneling protocol, but is also applicable to other tunneling protocols as described above.

In one embodiment, if a single node 110 is selected, the preparation module 216 may wrap or include a first data packet (e.g., an "inner" data packet) into a data body or payload of a second data packet (e.g., an "outer" data packet) to form a test data packet. The preparation module 216 may further generate two packet headers, an inner packet header for the inner data packet and an outer packet header for the outer data packet. The preparation module 216 may set or include routing information (e.g., a global address, a local address, a hop count, etc.) associated with the selected node 110 in the outer packet header of the outer data packet, and routing information of another node 110 (e.g., a destination node 110 or device 104) in the inner packet header of the inner data packet. Depending on the type of protocol or addressing scheme that the network 108 employs and/or the devices 104 or nodes 110 adopts, a packet header may include an IPv6 packet header, an IPv4 header, etc.

Additionally or alternatively, if a connection link 112 is selected, the preparation module 216 may wrap or include a first data packet into a second data packet to form a test data packet. The preparation module 216 further generates two packet headers, a first packet header for the first data packet and a second packet header for the second data packet. The preparation module 216 may set or include routing information (e.g., a global address, a local address, a hop count, etc.) associated with a first end of the connection link 112 in the first packet header of the first data packet, and routing information of a second end of the connection link 112 in the second packet header of the second data packet. Additionally, if a destination node 110 is different from a first end of the connection link 112, the preparation module 216 may wrap or include a third data packet into the first data packet with a packet header of the third data packet including routing information associated with the destination node 110 or device 104.

In some embodiments, if more than one node 110 and/or connection link 112 is selected, the preparation module 216 may iteratively wrap or include respective data packets corresponding to the selected nodes 110 and/or connection links 112 one after one as described above to form a test data packet. Furthermore, the preparation module 216 may generate packet headers of the respective data packets accordingly to set or include routing information of the selected nodes 110 and/or connection links 112 therein respectively. In some instances, routing information included in a packet header of an innermost data packet of the test data packet may correspond to routing information for the destination node 110 or device 104.

In some embodiments, the preparation module 216 may set one or more other properties or parameters in respective packet headers of one or more data packets associated with the selected nodes 110 and/or connection links 112 of the test data packet. For instance, the preparation module 216 may set a value of DSCP (Differentiated Services Code Point) on a packet header of a data packet associated with a selected node 110 or connection link 112 to control a priority group (PG) that the data packet belongs to on a path that the data packet traverses. Additionally or alternatively, the preparation module 216 may set a value of ECN (Explicit Congestion Notification) on a packet header of a data packet associated with a selected node 110 or connection link 112 to control congestion experience that the data packet may have on a path that the data packet traverses.

Upon creating or generating the test data packet, a sending module 220 of the network monitoring system 102 may send out the test data packet to the destination node 110 or device 104 via the network 108. Additionally, the network monitoring system 102 may include a receiving module 222 that is configured to wait or listen for a routing result of the test data packet. In one embodiment, the routing result may include a result of whether an encapsulated data packet of the test data packet (e.g., the innermost data packet encapsulated in the test packet) is received at the destination node 110 or device 104, etc. Depending on whether the destination node 110 or device 104 includes the network monitoring system 102 or a portion thereof, the receiving module 222 may receive the routing result at the destination node 110 or device 104 (in which at least a part of the network monitoring system 102 is included), or as a notification message sent from the destination node 110 or device 104 (where the network monitoring system 102 is an entity independent of the destination node 110 or device 104).

In one embodiment, a determination module 224 of the network monitoring system 102 may determine the operation or health condition of the selected node 110 or connection link 112 according to one or more predetermined criteria. The one or more predetermined criteria may include, for example, whether a routing result is received by the receiving module 222, whether the routing result is received by the receiving module 222 within a predetermined time period, etc. If no routing result is received or if a routing result is received outside a predetermined time period, the determination module 224 may determine that the selected node 110 or connection link 112, of which operating or health condition is to be analyzed, is susceptible to a problematic condition, e.g., the selected node 110 or connection link 112 being overloaded or suffering traffic congestion, being broken or malfunctioning, etc. For instance, if a routing result is received by the receiving module 222 outside a predetermined time period, the determination module 224 may determine that the selected node 110 or connection link 112 may be susceptible to overloading or traffic congestion. If no routing result is received by the receiving module 222, the determination module 224 may determine that selected node 110 or connection link 112 may be susceptible to malfunctioning or being broken, for example.

In some embodiments, the determination module 224 may determine that a problem exists in the network 108, but may not be able to distinguish whether the problem is related to the selected node 110 or connection link 112, or other nodes or connection links in the network 108. The determination module 224 may determine that a further analysis is desirable. The determination module 224 may instruct the selection module 214 to select one or more other nodes 110 and/or connection links 112 that are adjacent to the selected node 110 or connection link 112 to analyze or determine their operation or health conditions. In one embodiment, a first node or connection link is adjacent to a second node or connection link if the first node or connection link is at a predetermined number of hops (e.g., one, two, three, etc.) away from the second node or connection link. The predetermined number of hops may be defined by a network administrator or operator (e.g., the user 122) of the network 108, for example. Additionally or alternatively, the determination module 224 may provide a prompt to the user 122 and request the user 122 to provide instructions and/or indications of which one or more other nodes 110 and/or connection links 112 are to be analyzed. In some embodiments, the network monitoring system 102 may further include other program data 120 such as records of operating conditions and/or corresponding issues of one or more nodes 110 and/or connection links 112 that have been analyzed.

Example Scenario

Figure 3A:
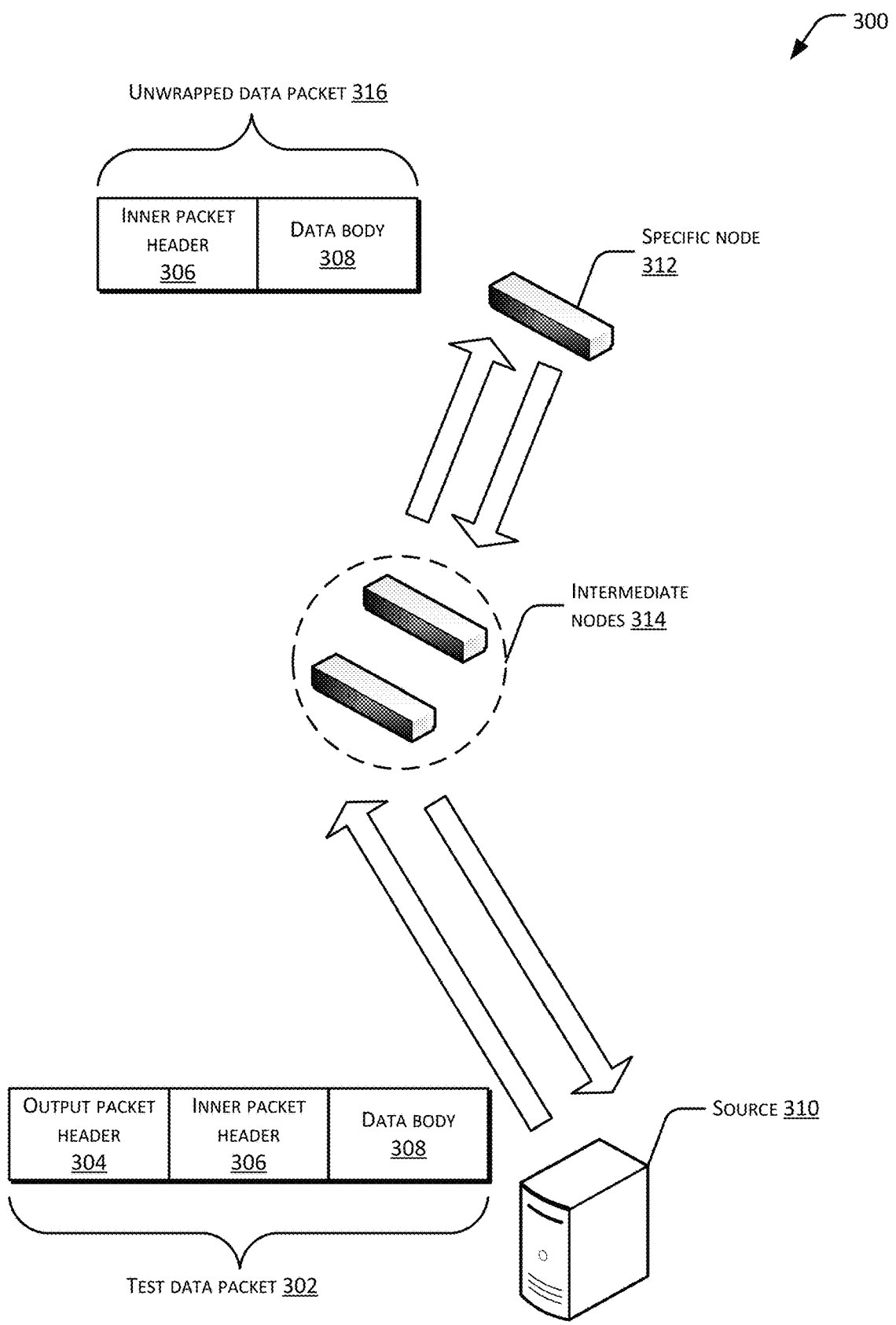
FIGS. 3A and 3B illustrate example frameworks for routing a test data packet in a network.

FIG. 3A illustrates a first example framework or scenario 300 of traversing a test data packet in accordance with the foregoing embodiments. In this example, the network monitoring system 102 prepares a test data packet 302, which includes an outer packet header 304, an inner packet header 306 and a data body (or payload) 308, as described in the foregoing embodiments. For example, the outer packet header 304 includes routing information (such as a global address, a local address or a hop count, etc.) associated with a specific node 312 (e.g., a switch such as a core switch) of which operating condition is to be analyzed as a destination address. Also, in this example, the inner packet header 306 has routing information of a source 310 as corresponding destination address of an inner packet. The network monitoring system 102 may then send the test data packet 302 from the source 310 (e.g., the device 104 or the server 106) via the network 108.

In one embodiment, the test data packet 302 may be routed through one or more intermediate nodes 314 and arrive at the specific node 312. The test data packet 302 may be decapsulated or unwrapped at a data plane or layer of the specific node 312 without consuming processing resources of the specific node 312. Upon decapsulating or unwrapping, the decapsulated or unwrapped data packet 316 may be routed or forwarded to the source 310 via the one or more intermediate nodes 314 (which may or may not be the same as the nodes when the test data packet 302 is routed from the source 310 to the specific node 312) based on the destination address included in the inner packet header 306. In one embodiment, the decapsulated or unwrapped data packet 316 may be routed or forwarded to the source 310 via the one or more intermediate nodes 314 using a same mechanism for forwarding or routing a normal or common data packet. After arriving at the source 310, the network monitoring system 102 may analyze information associated with the decapsulated or unwrapped data packet 316 to determine the operation condition of the specific node 312 as described in the foregoing embodiments.

In some embodiments, if a problem exists for the specific node 312, e.g., the specific node 312 is broken or has overloaded, the test data packet 302 may not be able to reach the specific node 312 and hence no data packet associated with the test data packet 302 may be received at the source 310. In this case, the network monitoring system 102 may determine or detect that the specific node 312 is currently experiencing a problem. The network monitoring system 102 may then provide an analysis result for presentation to the user 122 via the display 124 of the device 104, and wait for further instruction from the user 122. Additionally or alternatively, the network monitoring system 102 may, with or without intervention or instruction from the user 122, progressively select one or more nodes 110 and/or connection links 112 that are adjacent to the specific node 312 to identify or locate a source of the problem.

Figure 3B:
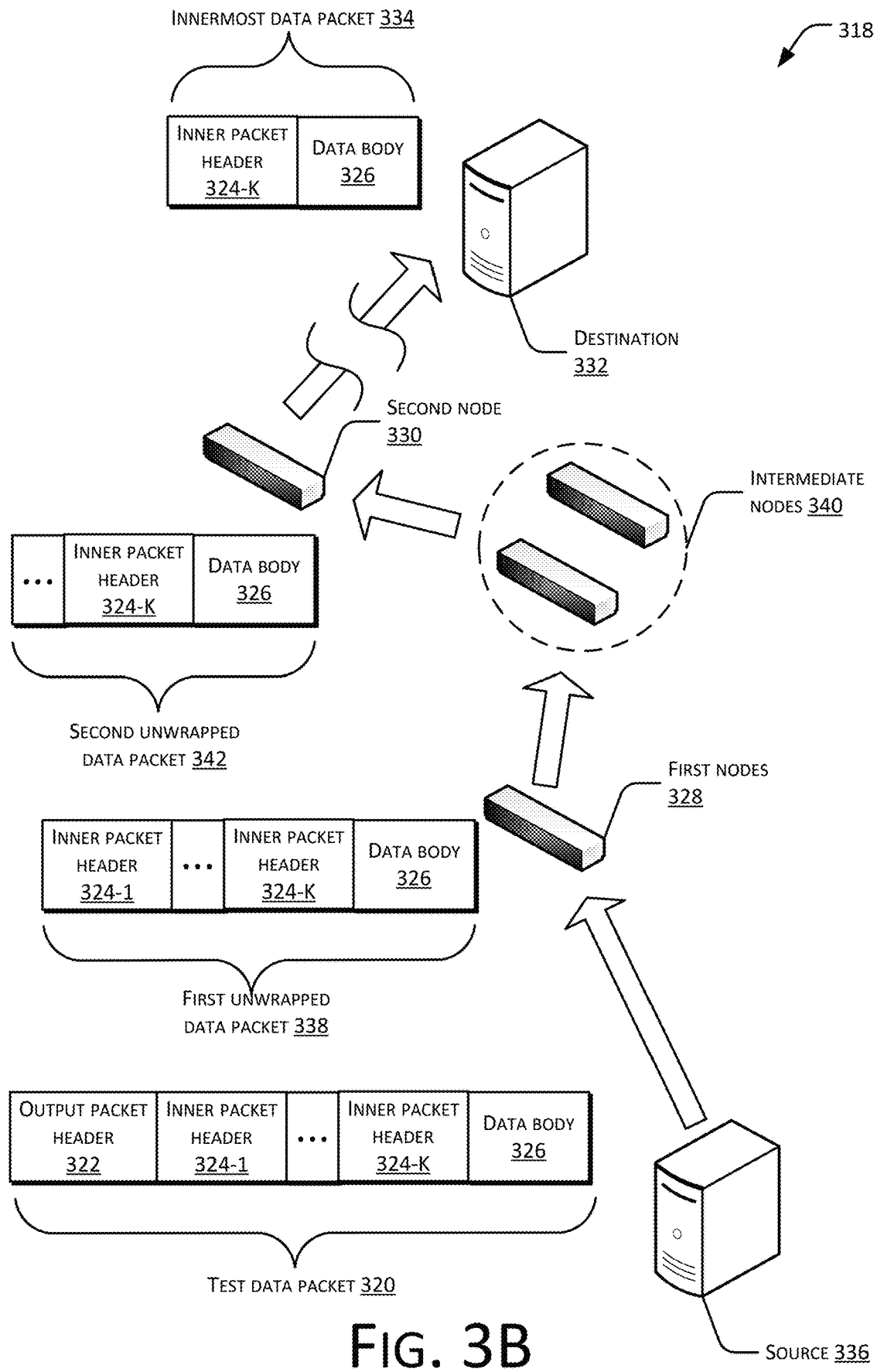

FIG. 3B illustrates a second example framework or scenario 318 of traversing a test data packet in accordance with the foregoing embodiments. In this example, the network monitoring system 102 may determine or analyze operation or health conditions of multiple nodes 110 and/or connection links 112 at a single monitoring probe or try. In one embodiment, the test data packet 320 may include an outer packet header 322, multiple inner packet headers 324-1, ..., 324-K, and a data body (or payload) 326, as described in the foregoing embodiments, where K is an integer greater than one. The outer packet header 322 may include routing information (such as a global address, a local address or a hop count, etc.) associated with a first node 328 (e.g., a switch such as a ToR switch) of which operating condition is to be analyzed as a destination address. The inner packet header 324-1 may include routing information (such as a global address, a local address or a hop count, etc.) associated with a second node 330 (e.g., a switch such as an aggregate switch) of which operating condition is to be analyzed as a destination address. Also, in this example, the innermost packet header 324-K may include routing information of a destination 332 as corresponding destination address of an innermost data packet 334. The network monitoring system 102 may then send the test data packet 320 from a source 336 (e.g., the device 104 or the server 106) via the network 108.

In one embodiment, when the test data packet 320 is successfully routed and arrived at the first node 328, the test data packet 320 is decapsulated or unwrapped at a data plane or layer of the first node 328 to expose the inner packet header 324-1 with or without consuming processing resources of the first node 328. Upon decapsulating or unwrapping, the first unwrapped data packet 338 may subsequently be routed to the second node 330 via M number of intermediate nodes 340 based on the destination address included in the inner packet header 324-1, where M is an integer equal to or greater than zero. In one embodiment, the first unwrapped data packet 338 may be routed or forwarded to the second node 330 using a same mechanism for forwarding or routing a normal or common data packet. In one instance, if arriving successfully at the second node 330, the first unwrapped data packet 338 may be decapsulated or unwrapped at a corresponding data plane or layer of the second node 330 to generate a second unwrapped data packet 342. The second unwrapped data packet 342 may then be routed to another node of which operating condition is to be analyzed or the destination 332 via zero or some intermediate nodes. In one embodiment, the secnd unwrapped data packet 342 may be routed or forwarded to the destination 332 using a same mechanism for forwarding or routing a normal or common data packet. Depending on whether the innermost data packet 334 of the test data packet 320 is arrived successfully at the destination 332, the network monitoring system 102 may determine whether one or more of the multiple nodes 110 and/or connection links 112 are working properly or overloading, etc., as described in the foregoing embodiments.

Alternative Implementations

Although the network monitoring system 102 is described to be a part of or included in the device 104 from which a test data packet is sent and/or received, in some embodiments, the network monitoring system 102 may be included in one or more devices 104 and/or one or more servers 106 that are different from a device 104 from which the test data packet is sent and/or a device 104 at which the test data packet is destined. In this instance, referring to FIG. 1 as an example, the network monitoring system 102 may send a request or instruction to a first device 104 (e.g., device 104-1), requesting the first device 104 to prepare and send a test data packet. The network monitoring system 102 may also send another request or instruction to a second device 104 which may be the same as or different from the first device 104, requesting the second device 104 to send a notification message back to the network monitoring system 102 regarding a routing result of the test data packet. In some instances, if the first device 104 and the second device 104 are the same, the network monitoring system 102 may send a single request or instruction to this same device 104 to achieve both sending of the test data packet and notifying of a routing result of the test data packet.

Furthermore, although the foregoing embodiments describe that the network monitoring system 102 generates or creates a test data packet for probing an operating or health condition of a selected node, in other instances, the network monitoring system 102 may incorporate this probing into an original or normal data packet that is originally or initially unrelated to network monitoring. For example, the original or normal data packet may include a data packet that is to be sent from a first device to a second device due to a request or operation of another application 118, the first device or the second device that is unrelated to network monitoring. In this case, the network monitoring system 102 may wrap or encapsulate the original data packet within a data packet corresponding to a node of which operating condition is to be analyzed to form a new data packet, and send the new data packet to the second device via the node to be analyzed. In some instances, the network monitoring system 102 may have negotiated or agreed with the second device regarding a data format that indicates this incorporation of the probing with the transmission of the original data packet, and may or may not modify a packet header and/or a data body (e.g., a payload) of the original data packet accordingly to indicate this incorporation. After receiving the original data packet (with or without modification depending on a format negotiated or agreed), the second device may recognize the modification based on the agreed data format and notify the network monitoring system 102 of a routing result of the original data packet (and hence a routing result of the data packet corresponding to the node to be analyzed).

Examples Methods

Figure 4:
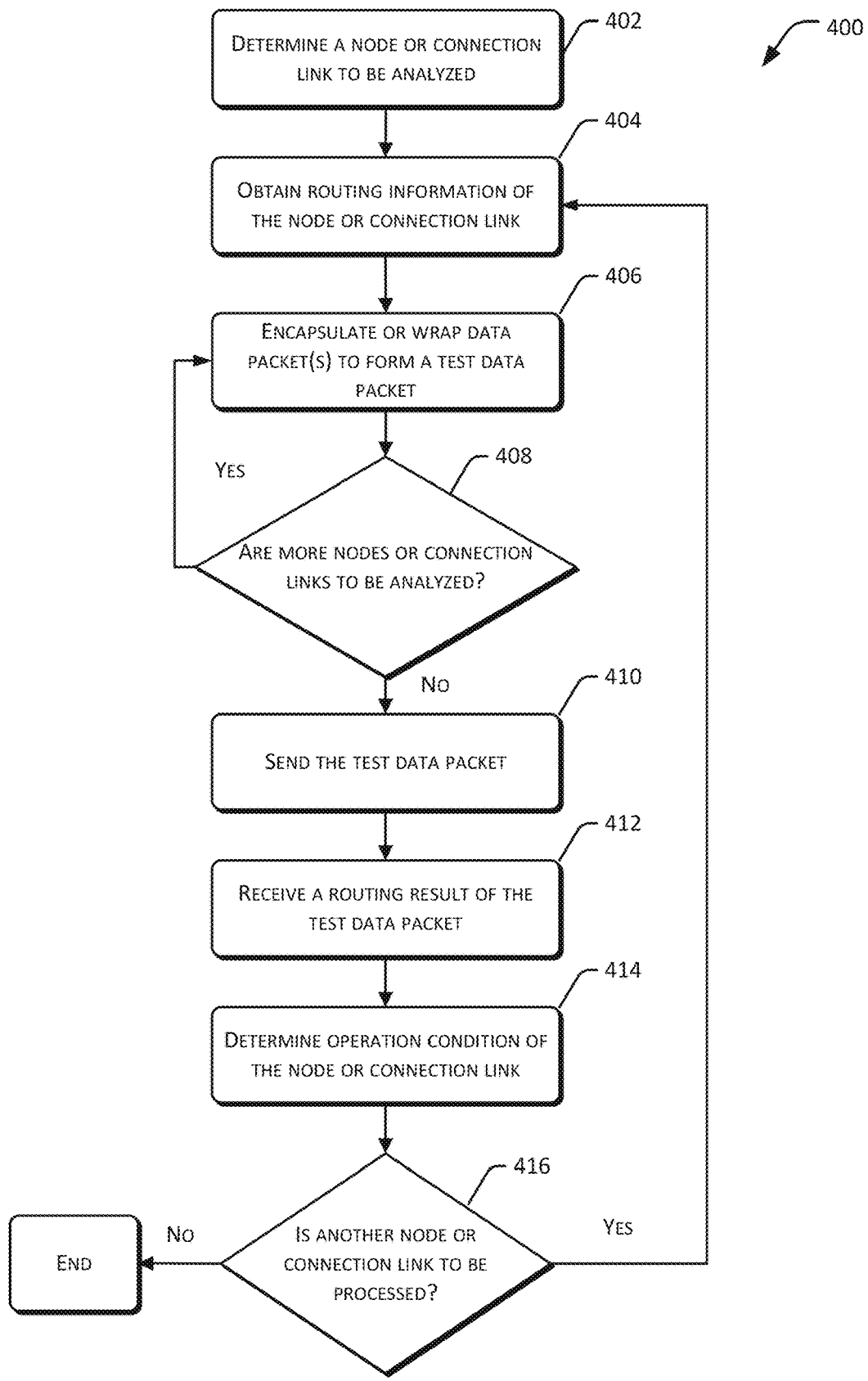
FIG. 4 illustrates an example method of fine-grained network monitoring.

FIG. 4 is a flow chart depicting an example method 400 of network monitoring. In some cases, the method of FIG. 4 may be implemented in the framework of FIG. 1, using the network monitoring system of FIG. 2 and/or under similar scenario corresponding to FIG. 3. For ease of explanation, the method 400 is described with reference to FIGS. 1-3. However, the method 400 may alternatively be implemented in other environments and/or using other systems.

The method 400 illustrated in FIG. 4 is described in the general context of computer-executable instructions. Generally, computer-executable instructions can include routines, programs, objects, components, data structures, procedures, modules, functions, and the like that perform particular functions or implement particular abstract data types. The method can also be practiced in a distributed computing environment where functions are performed by remote processing devices that are linked through a communication network. In a distributed computing environment, computer-executable instructions may be located in local and/or remote computer storage media, including memory storage devices.

The example method is illustrated as collections of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring to FIG. 4, at block 402, the method 400 includes determining a node or connection link to be analyzed. For example, referring to FIG. 2, the input module 210 or the selection module 214 may determine or select one or more nodes 110 and/or one or more connection links 112 of which operating or health conditions are to be analyzed.

At block 404, the method 400 includes obtaining routing information of the node or connection link to be analyzed. For example, referring to FIG. 2, the preparation module 216 may obtain respective routing information associated with the one or more selected nodes 110 and/or the one or more selected connection links 112.

At block 406, the method 400 includes encapsulating or wrapping one or more data packets to form a test data packet. For example, referring to FIG. 2, the preparation module 216 may encapsulate or wrap a first data packet into a second data packet to form a test data packet according to a tunneling protocol. In one embodiment, at least one of the first data packet and the second data packet corresponds to a selected node 110 or an end of a selected connection link 112.

At block 408, the method 400 includes determining whether one or more nodes and/or connection links are to be analyzed. For example, referring to FIG. 2, the preparation module 216 may determine whether more encapsulation or wrapping is to be performed for another selected node 110 or an end of another selected connection link 112. If more encapsulation or wrapping is to be performed, the preparation module 216 iteratively or repeatedly encapsulates or wraps the test data packet into another data packet corresponding to another selected node 110 or an end of another selected connection link 112.

At block 410, the method 400 includes sending the test data packet. For example, referring to FIG. 2, if no more encapsulation or wrapping is needed, the sending module 220 may send out the test data packet.

At block 412, the method 400 includes receiving a routing result of the test data packet. For example, referring to FIG. 2, the receiving module 222 may receive a routing result of the test data packet at or from a destination or final node 110 or device 104.

At block 414, the method 400 includes determining an operation condition of the node or connection link. For example, referring to FIG. 2, the determination module 224 may determine respective operation conditions of the one or more selected nodes 110 and/or the one or more selected connection links 112 based on the routing result and according to one or more predetermined criteria.

At block 416, the method 400 includes determining whether another node or connection link is to be analyzed. For example, referring to FIG. 2, the input module 210 or the selection module 214 may determine whether another node 110 or connection link 112 is to be analyzed. If no additional node 110 or connection link 112 is needed to be analyzed, the input module 210 or the selection module 214 may stop and wait for a next request or instruction. If an additional node 110 or connection link 112 is needed to be analyzed, the preparation module 216 may obtain routing information associated with the additional node 110 or connection link 112, and prepare a new test data packet.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media. Furthermore, the components and operations of the various embodiments as described in the foregoing may be combined, rearranged, substituted and/or omitted without departing from the present disclosure.

Example User Interface

Figure 5:
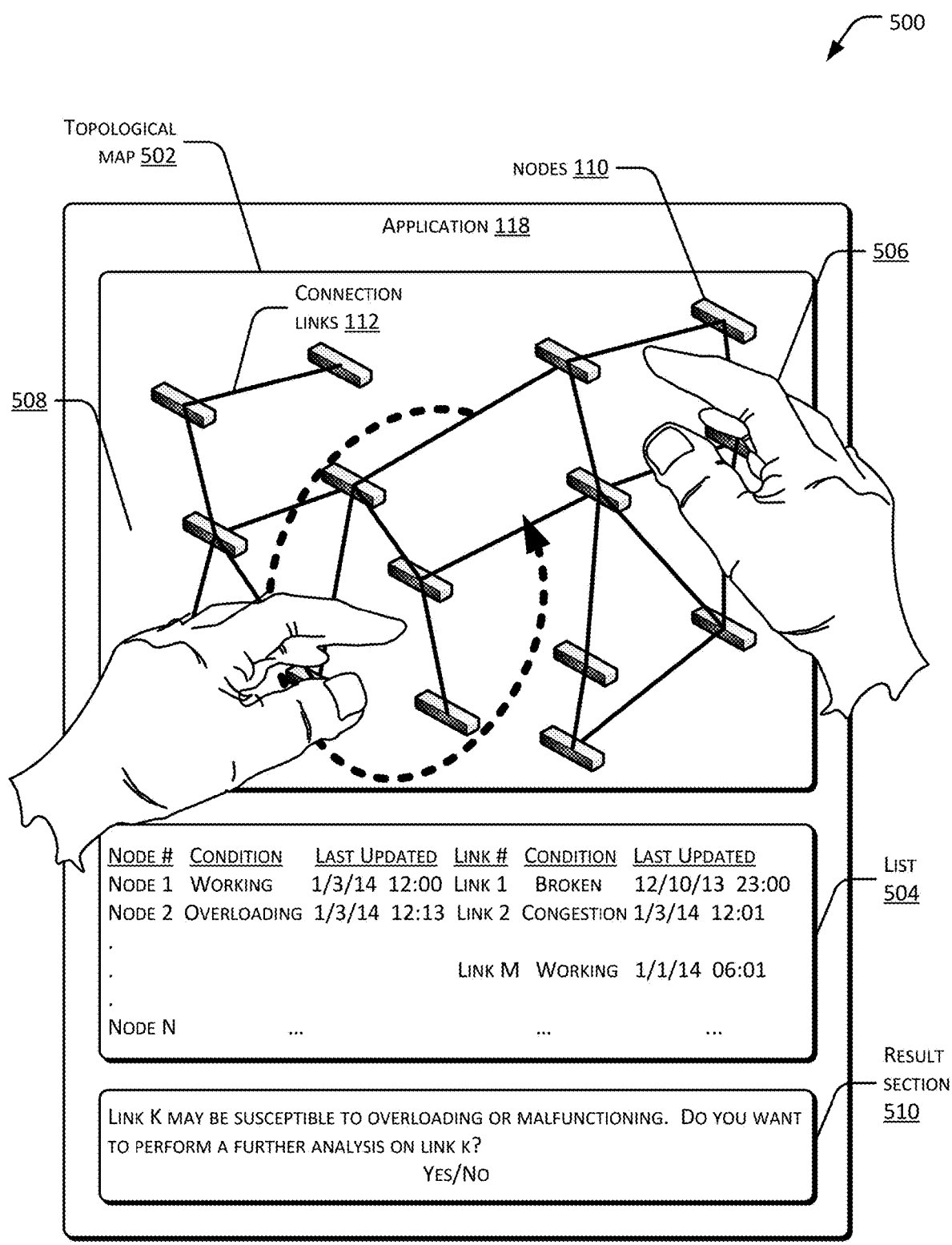
FIG. 5 illustrates an example user interface of a device of the example fine-grained network monitoring system as shown in FIG. 1.

FIG. 5 illustrates an example user interface 500 that may be used by the example network monitoring system 102 for interacting or communicating with the user 122. In this example, the user interface 500 is described to be a user interface provided through the application 118, e.g., the network monitoring application of the device 104. In other instances, the user interface 500 may be a user interface provided remotely by the network monitoring system 102 and presented to the user 122 through the application 118 (e.g., a browser application) via the display 124 of the device 104. In this example, the display 124 is described to be a touch screen. In other instances, the display 124 may include a normal screen without touch-sensitive capability.

In one embodiment, the user interface 500 may include a topological map 502 and/or a list 504 of a part or all of the nodes 110 and/or the connection links 112 in the network 108. The topological map 502 and/or the list 504 may provide information associated with one or more nodes 110 and/or connection links 112 in the network 108. Examples of information provided may include, but are not limited to, identification information of the one or more nodes 110 and/or connection links 112, operation conditions of the one or more nodes 110 and/or connection links 112, last updated times of the one or more nodes 110 and/or connection links 112, etc. In one instance, information associated with a node 110 and/or a connection link 112 may be presented to the user 112 on the topological map 502 when the user 122 places a pointing instrumentality (such as a finger or a stylus for a touch screen, a mouse for a normal screen, etc.) on a graphic object representing that node 110 or connection link 112.

In one embodiment, the user 122 may select 506 a particular node 110 or connection link 112 for instructing the network monitoring system 102 to determine an operation or health condition of that particular node 110 or connection link 112. In some embodiments, the user 122 may select 508 a part or subset of the network 108 that includes one or more nodes 110 and/or one or more connection links 112 of which operation conditions are to be analyzed.

Upon receiving an indication of selection of a particular node 110 or connection link 112 (or a subset of the network 108) via the input module 210, the network monitoring system 102 may perform network monitoring of the selected node 110 or connection link 112 (or the selected subset of the network 108) as described in the foregoing embodiments. In response to determining the operation condition of the selected node 110 or connection link 112 (or the selected subset of the network 108), the network monitoring system 102 may provide an analysis result for presentation to the user 122 in a result section 510 of the user interface 500.

Additionally or alternatively, in some embodiments, the application 118 may present the analysis result in a different region (i.e., the result section) of the user interface 500. By way of example and not limitation, the user interface 500 or the application 118 may update a portion of the topological map 502 and/or the list 504 corresponding to the selected node 110 or connection link 112 (or the selected subset of the network 108) to show the analysis result. In one embodiment, the user interface 500 or the application 118 may highlight the updated portion of the topological map 502 and/or the list 504 to allow the user 122 to easily detect the analysis result of the selected node 110 or connection link 112 (or the selected subset of the network 108). The user interface 500 or the application 118 may highlight the updated portion by using a different color, style (e.g., text size, font, style, etc.), Additionally or alternatively, the user interface 500 or the application 118 may highlight the updated portion by blinking or flashing the updated portion, for example.

Additionally, in some embodiments, the network monitoring system 102 may allow the user 122 to determine whether to perform a further analysis on the selected node 110 or connection link 112 (or one or more nodes 110 and/or connection links 112 of the selected subset of the network 108) to determine which problem (overloading, malfunctioning, broken, etc.) is most likely experienced by the selected node 110 or connection link 112 (or the one or more nodes 110 and/or connection links 112 of the selected subset of the network 108).

CONCLUSION

Although embodiments have been described in language specific to structural features and/or methodological acts, it is to be understood that the claims are not necessarily limited to the specific features or acts described. Rather, the specific features and acts are disclosed as exemplary forms of implementing the claimed subject matter.

What is claimed is:

1. A method comprising:
under control of one or more processing units configured with executable instructions:
receiving a selection of a portion of a network and a selection of a subject node selected from an interactive display of a topology map of the network;
automatically selecting a plurality of destination nodes that includes the subject node based on the selection and a selection algorithm, wherein a first subset of the plurality of destination nodes are between a source node and the subject node in the topology map, wherein a second subset of the plurality of destination nodes are between the subject node and a final node of the plurality of destination nodes in the topology map, and wherein the selection algorithm selects the plurality of destination nodes at random from a superset of nodes included in the topology map that includes the first subset and the second subset;
receiving a path definition for a health condition check between the source node and the final node, wherein the path definition includes a path that traverses the plurality of destination nodes between the source node and the final node;
based on the path definition, generating a test data packet by iteratively encapsulating at least a first packet into a second packet and at least the second packet into a third packet using tunneling encapsulation to form the test data packet, wherein the test data packet includes a plurality of layers including a first layer including the first packet for transmission of the test data packet to a first node of the plurality of destination nodes and a second layer including the second packet for transmission of the test data packet to a second node of the plurality of destination nodes;
transmitting, via a connection link, the test data packet to the final node the plurality of destination nodes, wherein the test data packet is routed through the plurality of destination nodes as indicated by the plurality of layers of the test data packet;
determining a health condition of the subject node based at least in part on a result of the transmitting of the test data packet; and
transmitting, based on the health condition, the test data packet via an adjacent connection link between the subject node and a preceding destination node of the plurality of nodes in the network topology map to determine a status of the connection link.

2. The method as recited in claim 1, wherein the encapsulating further comprises including address information of a respective destination node the plurality of destination nodes in respective packet headers of the first and second packets, and wherein the address information comprises a global address or a local address of the respective destination node, the global address corresponding to an address routable in a network including the plurality of destination nodes and the subject node, and the local address corresponding to an address reachable by one or more neighbors of the respective destination node of the plurality of destination nodes.

3. The method as recited in claim 2, wherein transmitting the test data packet comprises transmitting the test data packet to a first destination node according to destination address information included in a packet header of the third packet, the first destination node decapsulating the third packet to obtain the second packet and the first destination node, forwarding the second packet to a second destination node according to destination address information included in the packet header of the second packet, the second destination node decapsulating the second packet to obtain the first packet and the second destination node, forwarding the first packet to a third destination node according to destination address information included in the packet header of the first packet.

4. The method as recited in claim 1, wherein the test data packet comprises a number of hops that the test data packet has traversed from the source node that sends the test data packet to the subject node.

5. The method as recited in claim 1, further comprising determining that the plurality of destination nodes are functioning when the result of the transmitting of the test data packet corresponds to a success in a receiving of the test data packet within a predetermined time threshold at the final node.

6. One or more non-transitory computer-readable media storing executable instructions that, when executed by one or more processors, cause the one or more processors to perform acts comprising:
receiving a selection of a portion of a network and a selection of a subject node selected from an interactive display of a topology map of the network;
automatically selecting a plurality of destination nodes that includes the subject node based on the selection and a selection algorithm, wherein a first subset of the plurality of destination nodes are between a source node and the subject node in the topology map, wherein a second subset of the plurality of destination nodes are between the subject node and a final node of the plurality of destination nodes in the topology map, and wherein the selection algorithm selects the plurality of destination nodes at random from a superset of nodes included in the topology map that includes the first subset and the second subset;

receiving a path definition for a health condition check between the source node and the final node, wherein the path definition includes a path that traverses the plurality of destination nodes between the source node and the final node;

based on the path definition, generating a test data packet by iteratively encapsulating at least a first packet into a second packet and at least the second packet into a third packet using tunneling encapsulation to form the test data packet, wherein the test data packet includes a plurality of layers including a first layer including the at least first packet for transmission of the test data packet to a first node of the plurality of destination nodes and a second layer including the at least second packet for transmission of the test data packet to a second node of the plurality of destination nodes;

transmitting, via a connection link, the test data packet to the final node via the plurality of destination nodes, wherein the test data packet is routed through the plurality of destination nodes as indicated by the plurality of layers of the test data packet;

determining a health condition of the subject node based at least in part on a result of the transmitting of the test data packet; and transmitting, based on the health condition, the test data packet via an adjacent connection link between the subject node and a preceding destination node of the plurality of nodes in the network topology map to determine a status of the connection link.

7. The one or more computer-readable media as recited in claim 6, wherein iteratively encapsulating the at least first packet into the at least second packet and the at least second packet into the third packet using tunneling encapsulation to form the test data packet comprises iteratively setting destination addresses of a respective destination node of the plurality of destination nodes in respective packet headers of respective data packets included in the test data packet.

8. The one or more computer-readable media as recited in claim 7, further comprising determining whether a global address, a local address or a combination thereof is used as a destination address of a respective destination node in a packet header of a respective data packet of the respective destination node.

9. The one or more computer-readable media as recited in claim 6, the acts further comprising adding information of number of hops that the test data packet is traversed from the source node that sends the test data packet to the subject node.

10. The one or more computer-readable media as recited in claim 6, wherein the subject node to which the test data packet is destined is the same as the source node from which the test data packet is originated, and the acts further comprise:

sending out the test data packet; and wherein determining the health condition of the subject node is based at least in part on whether the test data packet is received.

11. A system comprising:
one or more processing units;
memory storing executable instructions that, when executed by the one or more processing units, cause the one or more processing units to perform acts comprising:

receiving a selection of a portion of a network and a selection of a subject node selected from an interactive display of a topology map of the network;

automatically selecting a plurality of destination nodes that includes the subject node based on the selection and a selection algorithm, wherein a first subset of the plurality of destination nodes are between a source node and the subject node in the topology map, wherein a second subset of the plurality of destination nodes are between the subject node and a final node of the plurality of destination nodes in the topology map, and wherein the selection algorithm selects the plurality of destination nodes at random from a superset of nodes included in the topology map that includes the first subset and the second subset;

receiving a path definition for a health condition check between the source node and the final node, wherein the path definition includes a path that traverses the plurality of destination nodes between the source node and the final node;

based on the path definition, iteratively including at least a first data packet within a second data packet and at least the second data packet within a third data packet using tunneling encapsulation, a packet header of the at least second data packet comprising information associated with the plurality of destination nodes of which a health condition is to be determined for network monitoring, a packet header of the third data packet comprising information associated with the subject node of which health condition is to be determined, and a packet header of the at least first data packet comprising information associated with the final node that determines operating condition of each destination node of the plurality of destination nodes, wherein the third data packet includes a plurality of layers including a first layer including the at least first data packet for transmission of a test data packet to a first node of the plurality of destination nodes and a second layer including the at least second data packet for transmission of the test data packet to a second node of the plurality of destination nodes;

sending out the third data packet via a connection link that includes the plurality of destination nodes to determine the health condition of the subject node; and transmitting, based on the health condition, the third data packet via an adjacent connection link to the subject node to determine a status of the connection link, wherein the third data packet is routed between the subject node and a preceding destination node of the plurality of nodes in the network topology map as indicated by the plurality of layers of the test data packet.

12. The system as recited in claim 11, wherein the information associated with the plurality of destination nodes comprises a global address or a local address of each destination node of the plurality of destination nodes.

* * * * *